US010802849B1

(12) United States Patent
Trim et al.

(10) Patent No.: US 10,802,849 B1
(45) Date of Patent: Oct. 13, 2020

(54) GUI-IMPLEMENTED COGNITIVE TASK FORECASTING

(71) Applicant: International Business Machines Corporation, Armonk, NY (US)

(72) Inventors: Craig M. Trim, Ventura, CA (US); Michael Bender, Rye Brook, NY (US); Martin G. Keen, Cary, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/441,651

(22) Filed: Jun. 14, 2019

(51) Int. Cl.
  *G06F 3/048* (2013.01)
  *G06F 9/451* (2018.01)
  *G06N 20/00* (2019.01)
  *G06Q 10/06* (2012.01)
  *H04L 12/58* (2006.01)
  *G06N 5/04* (2006.01)

(52) U.S. Cl.
  CPC ............ *G06F 9/453* (2018.02); *G06N 5/043* (2013.01); *G06N 20/00* (2019.01); *G06Q 10/063116* (2013.01); *H04L 51/046* (2013.01); *H04L 51/38* (2013.01)

(58) Field of Classification Search
  CPC ........ G06F 9/453; G06N 20/00; G06N 5/043; G06Q 10/063116; H04L 51/046; H04L 51/38
  USPC ......................................................... 715/710
  See application file for complete search history.

(56) References Cited

U.S. PATENT DOCUMENTS

| 8,782,556 | B2 * | 7/2014 | Badger ............... G06F 3/04883 715/816 |
| 9,524,355 | B2 | 12/2016 | Forbes et al. |
| 9,823,936 | B2 * | 11/2017 | Baklanovs .............. G06F 16/22 |
| 2014/0052791 | A1 | 2/2014 | Chakra et al. |
| 2014/0129331 | A1 | 5/2014 | Spivack et al. |
| 2015/0178626 | A1 | 6/2015 | Pielot et al. |
| 2015/0242459 | A1 | 8/2015 | Krishna |
| 2016/0005005 | A1 | 1/2016 | Dhara et al. |
| 2017/0293738 | A1 * | 10/2017 | Bender ............... G06F 19/3456 |
| 2018/0240015 | A1 * | 8/2018 | Martin .................... G06F 40/30 |
| 2018/0247549 | A1 * | 8/2018 | Martin ..................... G06N 3/08 |
| 2018/0247648 | A1 * | 8/2018 | Nadimpalli ............. G06N 5/04 |

(Continued)

OTHER PUBLICATIONS

"The Future of Collaboration Software—A Qualitative Study", Mikogo, 43 pages, printed Apr. 16, 2019. https://www.mikogo.com/downloads/docs/future-collaboration-software-trends.pdf.

(Continued)

*Primary Examiner* — David Phantana-angkool
(74) *Attorney, Agent, or Firm* — Daniel C. Housley

(57) ABSTRACT

A method, system, and computer program product for modifying a graphical user interface (GUI) according to cognitively forecasted tasks may collect a set of training data for a cognitive task managing model, where the set of training data associated with a user. The cognitive task managing model is then trained with the set of training data. The cognitive task managing model then processes a set of operational data that is associated with a user. In response to receiving a set of processed data, a task forecast is generated for the user. Based on that forecast, an optimal task for the user is determined. A set of graphical elements within the GUI are modified to notify the user of the optimal task.

14 Claims, 8 Drawing Sheets

(56) References Cited

U.S. PATENT DOCUMENTS

| | | | |
|---|---|---|---|
| 2019/0102675 A1* | 4/2019 | Biswas | G06N 3/0445 |
| 2019/0108355 A1* | 4/2019 | Carson | G06N 20/00 |
| 2019/0108417 A1* | 4/2019 | Talagala | G06N 20/00 |
| 2019/0138270 A1* | 5/2019 | Dolph | G10L 13/033 |
| 2019/0164065 A1* | 5/2019 | Velji | G06N 5/02 |
| 2019/0171187 A1* | 6/2019 | Cella | G06N 20/00 |
| 2019/0179509 A1* | 6/2019 | Daie | G06F 3/017 |
| 2019/0251514 A1* | 8/2019 | Verones | G06Q 10/1053 |
| 2020/0117765 A1* | 4/2020 | Sengupta | G06N 20/00 |
| 2020/0133254 A1* | 4/2020 | Cella | H04L 67/12 |

OTHER PUBLICATIONS

"Enterprise Collaboration Market worth 59.86 Billion USD by 2023", Markets and Markets, Press Release, 5 pages, printed Apr. 16, 2019. https://www.marketsandmarkets.com/PressReleases/enterprise-collaboration.asp.

Li et al., "Modeling information diffusion over social networks for temporal dynamic prediction", Proceedings of the 22nd ACM international conference on Information & Knowledge Management, San Francisco, California, USA—Oct. 27-Nov. 1, 2013, ACM New York, NY, USA © 2013, 4 pages.

Soon et al., "Modelling the Collaborative Mission Planning Process using Dynamic Teamwork Structures", AAMAS'03, Jul. 14-18, 2003, Melbourne, Australia, 2 pages.

Mell et al., "The NIST Definition of Cloud Computing", Recommendations of the National Institute of Standards and Technology, Special Publication 800-145, Sep. 2011, 7 pages.

* cited by examiner

GUI-IMPLEMENTED COGNITIVE TASK FORECASTING

BACKGROUND

The present disclosure relates generally to the field of task forecasting, and more particularly to a graphical user interface (GUI) delivering cognitively forecasted task notifications.

Collaborative messaging systems, combine instant messaging with collaborative community resources. This results in a powerful collaboration toon that is intensely data-driven. However, traditional collaborative communities may unintentionally provide a user with an overwhelming number of notifications, making navigation and task prioritization time consuming and difficult.

SUMMARY

Disclosed herein are embodiments of a method, system, and computer program product for modifying a GUI according to cognitively forecasted tasks.

A method, system, and computer program product for modifying a GUI according to cognitively forecasted tasks may collect a set of training data for a cognitive task managing model, where the set of training data associated with a user. The cognitive task managing model is then trained with the set of training data. The cognitive task managing model then processes a set of operational data that is associated with a user. In response to receiving a set of processed data, a task forecast is generated for the user. Based on that forecast, an optimal task for the user is determined. A set of graphical elements within the GUI are modified to notify the user of the optimal task.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
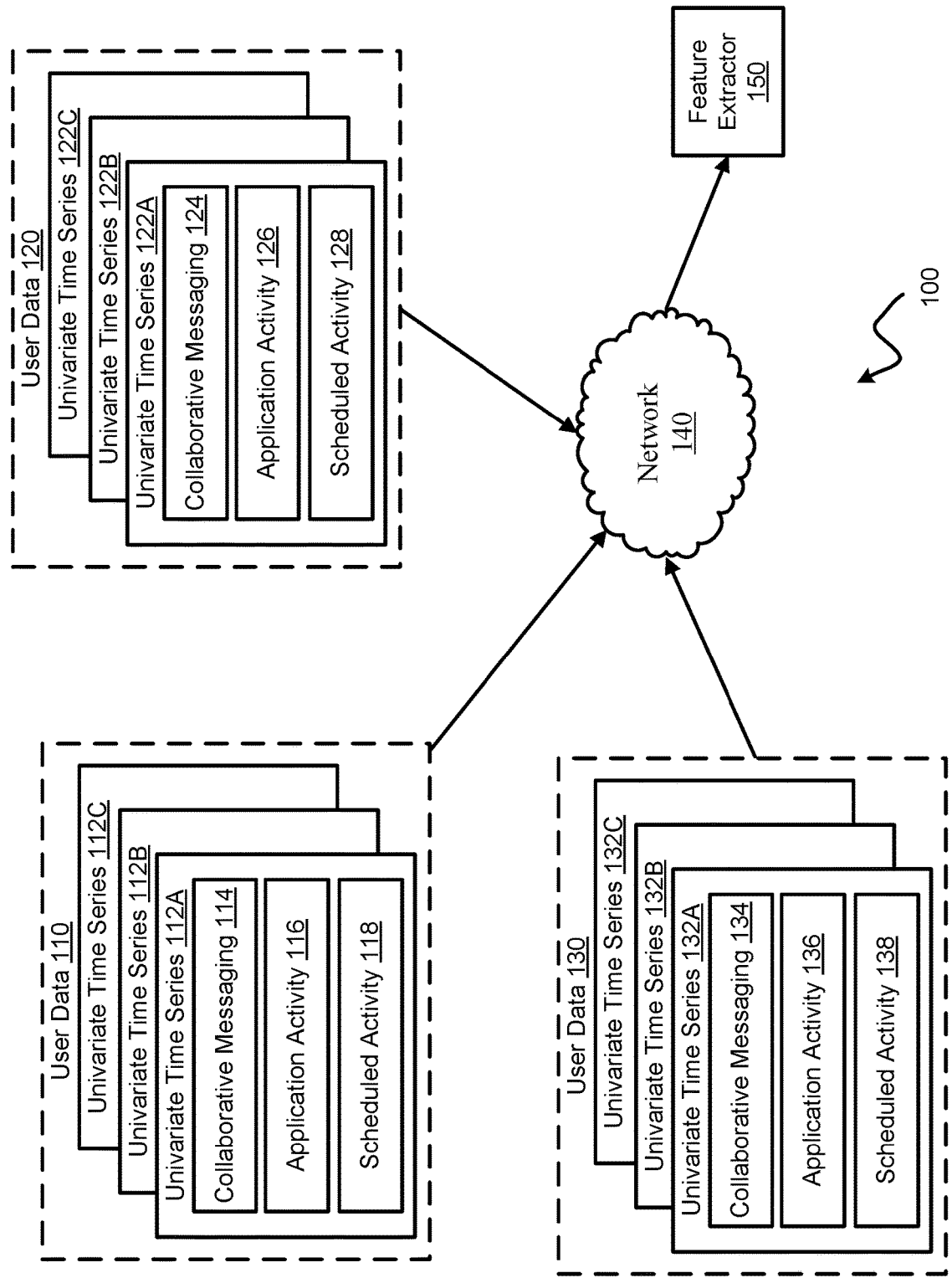
FIG. 1 illustrates an example network environment, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate generally to the field of task forecasting, and more particularly to a GUI delivering cognitively forecasted task notifications. While the present disclosure is not necessarily limited to such applications, various aspects of the disclosure may be appreciated through a discussion of various examples using this context.

The present disclosure describes the utilization of machine learning models to forecast immediate and future activities and tasks for a user of a collaborative platform and can be used to customize the platform to surface conversations and sub-communities that are relevant to the forecasted activity/task. In embodiments, a chat bot may be utilized to message reminders to the users associated with the forecasted task. In embodiments, a GUI may provide notifications to the users by modifying a set of graphical elements within the GUI.

Collaborative messaging systems can combine instant messaging services with the collaborative community resources. The result is a powerful, intensely data-driven collaboration tool. In such a collaborative platform, users may amass "memberships" or associations with multiple channels and topics, and each channel can have multiple sub-channels. Each sub-channel can, depending on the user's preferences, send notifications whenever updated material is posted, or whenever a user leaves a message or post on the sub-channel. As the number of user memberships grows, the number of notifications grows exponentially, which may lead to an overwhelming and constant barrage of notifications. While a user can disable all notifications, this can result in a user missing important information and updates.

Embodiments of the present disclosure provide a solution that can alleviate the notification deluge, while at the same time providing a user with information regarding when a task is coming due, as well as where (e.g., which sub-channel) the user needs to focus their attention. In other words, embodiments of the present disclosure can point a user to the proper place in both space (e.g., which channel/sub-channel(s) is/are relevant to a given task) and time (e.g., within a certain period of time before a task is due), without overwhelming the user with constant notifications of updates and new messages that may or may not be relevant to the task.

For example, Mike, a sales associate, may be scheduled to begin working on a client request for a proposal (RFP). Embodiments of the present disclosure may provide Mike, at the time that he is to be working on the RFP, with links to channels, sub-channels, or other users that may be helpful with this particular RFP. For example, let's say the RFP includes cloud computing services for a retail web portal for a clothing company. Embodiments of the present disclosure may provide Mike with links to, for example, cloud computing channels, web portal channels, other users with experience in web design and cloud computing services, other users that work with clients in clothing retail, etc.

Embodiments of the present disclosure may include collecting training data, using that training data to train a model, processing operational data, using processed operational data to generate a forecast of a user's task(s), and then notifying the user of that forecast. Additionally, historical information for users may be observed/monitored, and a feedback loop may be established to further adjust and train up the model to increase efficiency and maximize productivity. Embodiments of the present disclosure may be performed using a computing application in a suitable environment.

An initial stage of the present disclosure includes the collection of training data for a cognitive model for forecasting user tasks. According to embodiments, the training data may be univariate time series, organized by user. The term "univariate time series" may refer to a times series that consists of single observations recorded sequentially over equal time increments. For example, a user's activity may be recorded at particular time intervals (e.g., every 15 minutes, every hour, etc.). Each observation may include data regarding the user's collaborative messaging, application activity, and scheduled activity.

Collaborative messaging may include, for example, discussions that are written and/or accessed by the user on the collaborative platform. These discussions may be performed using the platform itself, through email, text messaging, instant messaging, etc. In embodiments, it may be possible for offline discussions to also be incorporated. For example, Alexa®, Google Home®, or other devices may capture the audio data of a meeting, phone call, etc. and use natural language processing (NLP) to determine if the discussion is relevant to a task.

Application activity may include, for example, the applications and programs that are running and/or being used on a user's device. For example, a user may be accessing a collaborative platform via a web browser, while also using a media program, for example PowerPoint®, Adobe Acrobat®, etc., to work on a presentation that will be uploaded to the collaborative platform.

Scheduled activity may include, for example, a user's calendar, to-do list, schedule, etc. For example, the collaborative platform may have its own calendar showing a user's scheduled tasks, or third-party programs may be associated with the user's schedule. For example, the user may track their schedule using their mobile phone's calendar, or using a calendar tied to their e-mail service (e.g., Google Calendar®, Lotus Notes®, Outlook®, etc.).

Multiple univariate time series for a group of users may be gathered and stored in a repository to provide a robust collection of training data for the cognitive forecasting model.

A second stage of the present disclosure includes training the cognitive forecasting model. In embodiments, some (or all) of the training data collected may be in an unstructured format (e.g., raw text). Therefore, in embodiments, it may be necessary to structure the training data in a way that the cognitive forecasting model can "understand." For example, textual data (e.g., emails, forum posts, documents, instant messaging transcripts, etc.) may need to be processed using NLP techniques. Audio data may need to be recorded in textual format, and subsequently processed using NLP techniques. Visual data (e.g., presentation slides, images, graphs, etc.) may need to be processed using image recognition techniques (e.g., using a convolutional neural network) so that the cognitive forecasting model can identify and understand the content.

Once the data in the univariate time series have been structured, the cognitive forecasting model may be trained to identify, for each univariate time series, what the user is doing, and with whom the user is working.

A third stage of the present disclosure includes the application of the trained cognitive forecasting model. Conventionally, Autoregressive Integrated Moving Average (ARIMA) has been widely used to perform forecasting using univariate time series data. Seasonal Autoregressive Integrated Moving Average (sARIMA) has also been used to address seasonal data elements occurring over lengthy periods of time, such as weeks, months, etc.

In embodiments of the present disclosure, a Micro Seasonal Autoregressive Integrated Moving Average (msARIMA) model is contemplated. The present model, msARIMA, addresses micro-seasonal elements (e.g., a user's activity patterns over the course of a day). The msARIMA model may be described thus:

msARIMA (p,d,q) (msP, msD, msQ)$_{ms}$

The trend elements for the msARIMA model are:
p: Trend autoregression order
d: Trend difference order
q: Trend moving average order
msP: Micro-seasonal autoregressive order
msD: Micro-seasonal difference order
msQ: Micro-seasonal moving average order
ms: Number of periods per micro-season In embodiments, an msARIMA model (e.g., the cognitive user task forecasting model) may be applied, at a fourth stage, to operational data (e.g., real-time observational data) to forecast, or generate, future univariate time series for a particular user. For example, the model can forecast, based upon previously observed activity, what a user is likely to be doing in the next univariate time series, or at a univariate time series at some point in the future (e.g., tomorrow at 2:45 PM). In embodiments, future univariate time series from the msARIMA-based cognitive model may be stored in a repository, along with confidence level outputs. This may be used to generate relevance paradigms for a given user during a given time series. In other words, the output of the model may be used to generate a task forecast for a particular user.

A fifth stage of the present disclosure may include notifying users of the forecasts generated by the cognitive user task forecasting model. Collaborative platforms may integrate such a model to direct users to the channels/sub-channels/conversations that are relevant to the forecasted activity. In embodiments, a forecasted activity may include a single user (e.g., a singular relevance paradigm), or multiple users (e.g., a collaborative relevance paradigm).

In embodiments where a singular relevance paradigm is contemplated, the application may identify the resources relevant to the single user's forecasted activity and flag those resources for the user. For example, if the user is forecasted to begin working on an RFP for Client X in the next micro-season (e.g., the next hour), the application may highlight recent conversations and sub-communities that are relevant to the topic of the RFP and/or Client X. Incoming conversations or conventional notifications that are related to these subjects may be assigned a higher priority, so that the user will be more likely to notice them as they work on the forecasted task. In embodiments, unrelated notifications may be muted during the micro-season(s) that are forecasted for the relevant task.

In embodiments where a collaborative relevance paradigm is contemplated, the application may need to consider the optimal univariate time series across a group of users (e.g., find the best time for all users to collaborate on a given task). For example, the application may forecast the best time series for a group of three users to work on a particular task. The application may automatically generate a chat bot to initiate an instant messaging service among all three users at the commencement of the optimal time series.

In an optional sixth stage, a historical closed feedback loop may be employed where user performance may be monitored and used to further adjust the cognitive model. For example, top performing users/groups may be identified, and the trends associated with those top performers may be used to weight the forecasts for all users.

Because the present disclosure contemplates computing applications and cognitive models, an understanding of the embodiments of the present disclosure may be aided by describing embodiments of computer networks and the environments in which these systems and applications may operate. FIG. 1 illustrates a block diagram of an example networking environment 100 in which embodiments of the present disclosure may be implemented.

Networking environment 100 may include user data 110, user data 120, and user data 130 (collectively referred to as user data 110-130). User data 110-130 may reside on, or be collected from, a variety of computing devices and/or repositories. For example, user data 110 may reside in the storage/memory of a desktop computer, user data 120 may reside in the storage/memory of a mobile phone, and user data 130 may reside in the storage/memory of a virtualized computing device running in a cloud computing environment.

User data 110-130 may include a plurality of univariate time series for a particular user. For example, univariate time series 112A-112C may all be associated with one individual user; univariate time series 122A-122C may all be associated with a second individual user, and univariate time series 132A-132C may all be associated with a third individual user.

As described herein, each univariate time series may include data regarding the collaborative messaging, the application activity, and the scheduled activity for each user. For example, collaborative messaging 114, application activity 116, and scheduled activity 118 may include, respectively, the data regarding the collaborative messaging, the application activity, and the scheduled activity for one individual user at a particular point in time, which is represented with univariate times series 112A. Univariate time series 112B and 112C may also include data regarding the collaborative messaging, the application activity, and the scheduled activity for the user (not shown), but at different (e.g., subsequent) points in time.

Likewise, univariate time series 122A may include collaborative messaging 124, application activity 126, and scheduled activity 128 for a second individual user at a particular point in time, which may, or may not, be the same point in time to which univariate time series 112A refers, for its respective user. Further, univariate time series 122B and 122C may also include data regarding the collaborative messaging, the application activity, and the scheduled activity for the second user (not shown), but at different (e.g., subsequent) points in time.

Likewise, univariate time series 132A may include collaborative messaging 134, application activity 136, and scheduled activity 138 for a third individual user at a particular point in time, which may, or may not, be the same point in time to which univariate time series 112A and/or 122A refer, for their respective users. Further, univariate time series 132B and 132C may also include data regarding the collaborative messaging, the application activity, and the scheduled activity for the third user (not shown), but at different (e.g., subsequent) points in time.

Networking environment 100 may further include network 140 and feature extractor 150. Feature extractor 150 may include, for example, hardware and/or software components for structuring data (e.g., NLP components, image recognition components, audio transcription components, etc.). Feature extractor 150 will be described in greater detail in FIG. 2.

In embodiments, the network 140 can be implemented using any number of any suitable communications media. For example, the network 140 may be a wide area network (WAN), a local area network (LAN), the Internet, or an intranet. In certain embodiments, the computing devices storing user data 110-130 and the feature extractor 150 may be local to each other, and communicate via any appropriate local communication medium. For example, the computing devices storing user data 110-130 and feature extractor 150 may communicate using a wireless local area network (WLAN), one or more hardwire connections, a wireless link or router, or an intranet. In some embodiments, the computing devices storing user data 110-130 and feature extractor 150, may be communicatively coupled using a combination of one or more networks and/or one or more local connections. For example, the computing devices storing user data 110-130 may be hardwired together (e.g., connected with Ethernet cables), while the feature extractor 150 may communicate with the other devices using the network 140 (e.g., over the Internet).

In some embodiments, the network 140 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 140.

It is noted that FIG. 1 is intended to depict the representative major components of an example computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
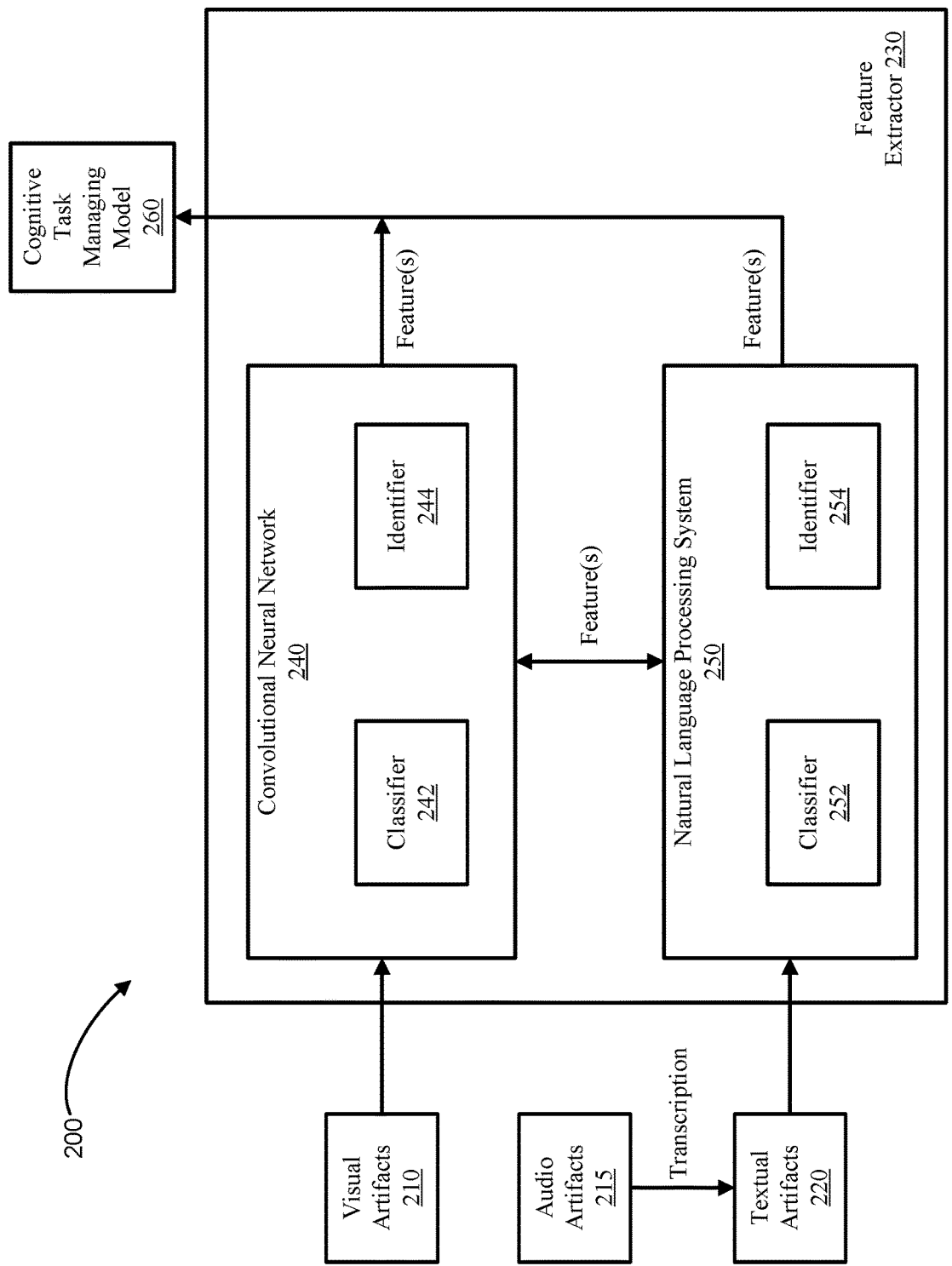
FIG. 2 illustrates an example diagram of a feature extractor, according to embodiments of the present disclosure.

Referring now to FIG. 2, illustrated is an example diagram 200 of a feature extractor 230, according to embodiments of the present disclosure. Feature extractor 230 may include, for example, a convolutional neural network 240 and a natural language processing system 250. Visual artifacts 210, audio artifacts 215, and textual artifacts 220 may be data included in univariate time series, as described herein. For example, visual artifacts 210 may include slides, graphs, bar charts, PDF files, images, video clips, images of calendars, images of textual transcripts, etc., and other non-textual, non-audio data encompassed in collaborative messaging, application activity, and scheduling activity.

Audio artifacts 215 may include, for example, audio recordings of meetings, phone calls, ambient conversations, dictations, etc. that can be encompassed in collaborative messaging, application activity, and scheduling activity. Audio artifacts 215 may be transcribed to become textual artifacts, such as textual artifacts 220.

Textual artifacts 220 may include transcriptions of audio artifacts 215, textual documents, programming code, metadata, emails, text messages, instant messages, forum posts, etc. that be encompassed in collaborative messaging, application activity, and scheduling activity.

In embodiments, feature extractor 230 receives unstructured data (e.g., artifacts) and converts it into machine-readable data that can be processed by cognitive task managing model 260. Feature extractor 230 may receive visual artifacts 210 (e.g., images, videos, etc.) into convolutional neural network 240. In embodiments, video data may be parsed into still frame images prior to being processed by convolutional neural network 240. Convolutional neural network 240 may execute image recognition techniques to identify components within the image (e.g., pie charts, graphs, individuals, objects, etc.) using an identifier 244, and classify the image (e.g., determine whether the artifact is a slide from a presentation, a frame from a driver's education video, a graph representing quarterly earnings, etc.) using classifier 242. The components and classification are machine-readable features of the visual artifacts 210. Convolutional neural network 240 may be a classifier-type neural network, which is described in greater detail in FIG. 3.

In embodiments, natural language processing (NLP) system 250 may include a classifier 252 and an identifier 254. Similar to identifier 244, identifier 254 may identify components within the textual artifacts 220. For example, identifier 254 may include, or store, information in a relational database, triplestore, or text index for identifying terms and phrases associated with topics (e.g., features of the textual artifact).

In embodiments, the natural language processing system 250 may be configured to analyze audio inputs directly. For example, in embodiments, audio recognition may be employed to identify a term or phrase in the audio input.

A superclass for the term or phrase may be determined, at classifier 252, by parsing a relational database for the term/phrase, and the superclass may be assigned as a topic, or feature, of the document/transcript/audio clip/etc.

In some embodiments, for example, in embodiments where a single artifact is parsed and used to extract features from both the visual and the audio aspects of the artifact, the features extracted from the artifact at either data structuring module (e.g., NLP system 250 or convolutional neural network 240) may be shared with the other data structuring module to enhance the artifact identification and classification. For example, a single training video on how to use a spreadsheet program may be parsed into still frames for image analysis at the convolutional neural network 240, and the audio track from the video may be transcribed and sent to the NLP system 250. Hypothetically, features extracted from the audio track may be used by the convolutional neural network 240 to aid in identifying image objects. For example, the video frame may show a spreadsheet grid, and the audio track may describe how to manipulate the content of the cells of the spreadsheet grid (e.g., a formula showing quarterly earnings divided by average employee work-hours). In this way, the convolutional neural network 240 may be able to infer that a particular cell in the given image is associated with the formula (quarterly earnings)/((total number of employee workhours)/(total number of employees)). Further, the convolutional neural network 240 may be able to infer that the video is an instructional/training video associated with corporate financial information.

Once extracted, features may be sent to cognitive task managing model 260. Cognitive task managing model 260 may be a multi-layer perceptron, a system of sigmoid neurons, a directed acyclic graph comprising a plurality of corelets, or any other structure/system capable of neural networking.

In embodiments, cognitive task managing model 260 may be used to process the features extracted from users' univariate time series in order to forecast user tasks, as described herein. Such forecasts may be used to determine, by user, what tasks are upcoming, which tasks should be prioritized, what resources will likely be needed for the tasks, and where a particular user may find those resources. An initial set of features with known properties (e.g., training data where features are already associated with upcoming tasks) may be used to train cognitive task managing model 260 prior to processing operational data (e.g., features extracted in order to forecast user tasks), as discussed herein.

In embodiments, cognitive task managing model 260 may utilize the features to analyze real-time input received/extracted from users' univariate time series and determine what tasks are upcoming, which tasks should be prioritized, what resources will likely be needed for the tasks, and where those resources can be found (e.g., which sub channels contain relevant conversations, which employees/users may be needed for collaboration, etc.). In embodiments, cognitive task managing model 260 may include a feedback loop where outputs (e.g., task forecasts) associated with the most productive employees are used as inputs to adjust/retrain cognitive task managing model 260 for all users. In this way, less-productive employees may benefit from the habits of the most productive employees.

Figure 3:
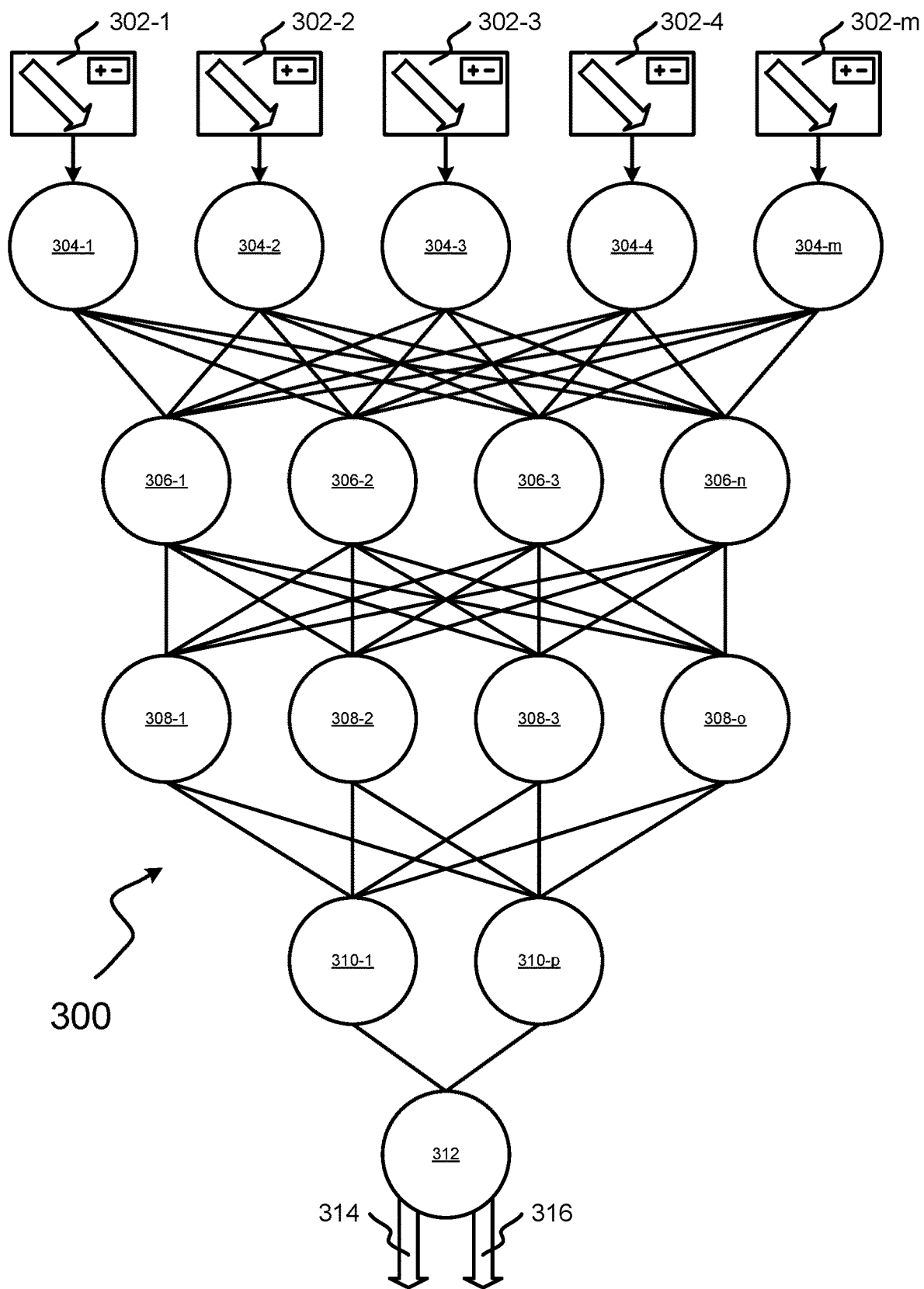
FIG. 3 depicts an example of a neural network, according to embodiments of the present disclosure.

FIG. 3 depicts an example neural network 300. Example neural network 300 may be specialized to perform the tasks associated with convolutional neural network 240 of FIG. 2, as well as the cognitive task managing model 260 of FIG. 2. For example, neural network 300 may process a set of features extracted from univariate time series associated with a particular user and generate cognitive task forecasts for that user using msARIMA, as described herein. In embodiments, neural network 300 may be a classifier-type neural network. Neural network 300 may be part of a larger neural network. For example, neural network 300 may be nested within a single, larger neural network, connected to several other neural networks, or connected to several other neural networks as part of an overall aggregate neural network.

Inputs 302-1 through 302-$m$ represent the inputs to neural network 300. In this embodiment, 302-1 through 302-$m$ do not represent different inputs. Rather, 302-1 through 302-$m$ represent the same input that is sent to each first-layer neuron (neurons 304-1 through 304-$m$) in neural network 300. In some embodiments, the number of inputs 302-1 through 302-$m$ (i.e., the number represented by m) may equal (and thus be determined by) the number of first-layer neurons in the network. In other embodiments, neural network 300 may incorporate one or more bias neurons in the first layer, in which case the number of inputs 302-1 through 302-$m$ may equal the number of first-layer neurons in the network minus the number of first-layer bias neurons. In some embodiments, a single input (e.g., input 302-1) may be input into the neural network. In such an embodiment, the first layer of the neural network may comprise a single neuron, which may propagate the input to the second layer of neurons.

Inputs 302-1 through 302-$m$ may comprise one or more artifact component(s) and a relative composition that is associated with a compositional artifact. For example, inputs 302-1 through 302-$m$ may comprise 10 components with their relative compositions that are associated with a seed artifact. In other embodiments, not all components and their relative compositions may be input into neural network 300. For example, in some embodiments, 30 components may be input into neural network 300, but relative compositions for only 20 components may be input into neural network 300.

Neural network 300 may comprise 5 layers of neurons (referred to as layers 304, 306, 308, 310, and 312, respectively corresponding to illustrated nodes 304-1 to 304-*m*, nodes 306-1 to 306-*n*, nodes 308-1 to 308-*o*, nodes 310-1 to 310-*p*, and node 312). In some embodiments, neural network 300 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 312 is treated as the output layer. Layer 312 outputs a probability that a target event will occur, and contains only one neuron (neuron 312). In other embodiments, layer 312 may contain more than 1 neuron. In this illustration no bias neurons are shown in neural network 300. However, in some embodiments each layer in neural network 300 may contain one or more bias neurons.

Layers 304-312 may each comprise an activation function. The activation function utilized may be, for example, a rectified linear unit (ReLU) function, a SoftPlus function, a Soft step function, an msARIMA function, or others. Each layer may use the same activation function, but may also transform the input or output of the layer independently of or dependent upon the ReLU function. For example, layer 304 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 306, for example, may be a dense layer. In this example, the dense layer may process and reduce the dimensions of the feature vector (e.g., the vector portion of inputs 302-1 through 302-*m*) to eliminate data that is not contributing to the prediction. As a further example, layer 308 may be a "batch normalization" layer. Batch normalization may be used to normalize the outputs of the batch-normalization layer to accelerate learning in the neural network. Layer 310 may be any of a dropout, hidden, or batch-normalization layer. Note that these layers are examples. In other embodiments, any of layers 304 through 310 may be any of dropout, hidden, or batch-normalization layers. This is also true in embodiments with more layers than are illustrated here, or fewer layers.

Layer 312 is the output layer. In this embodiment, neuron 312 produces outputs 314 and 316. Outputs 314 and 316 represent complementary probabilities that a target event will or will not occur. For example, output 314 may represent the probability that a target event will occur, and output 316 may represent the probability that a target event will not occur. In some embodiments, outputs 314 and 316 may each be between 0.0 and 1.0, and may add up to 1.0. In such embodiments, a probability of 1.0 may represent a projected absolute certainty (e.g., if output 314 were 1.0, the projected chance that the target event would occur would be 100%, whereas if output 316 were 1.0, the projected chance that the target event would not occur would be 100%).

FIG. 3 illustrates an example probability-generator neural network with one pattern-recognizer pathway (i.e., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 300 may be trained (e.g., biases and weights among nodes may be calibrated) using a set of training data (e.g., the features extracted from univariate time series associated with a particular user and known tasks/resources), receiving an output from the neural network (e.g., a hypothetical task forecast), and inputting corrections into the neural network to arrive at an expected output (e.g., the known task forecast). Once trained, inputs may be switched to operational data (e.g., univariate time series and features without a known forecast) to generate cognitive user task forecasts.

Figure 4A:
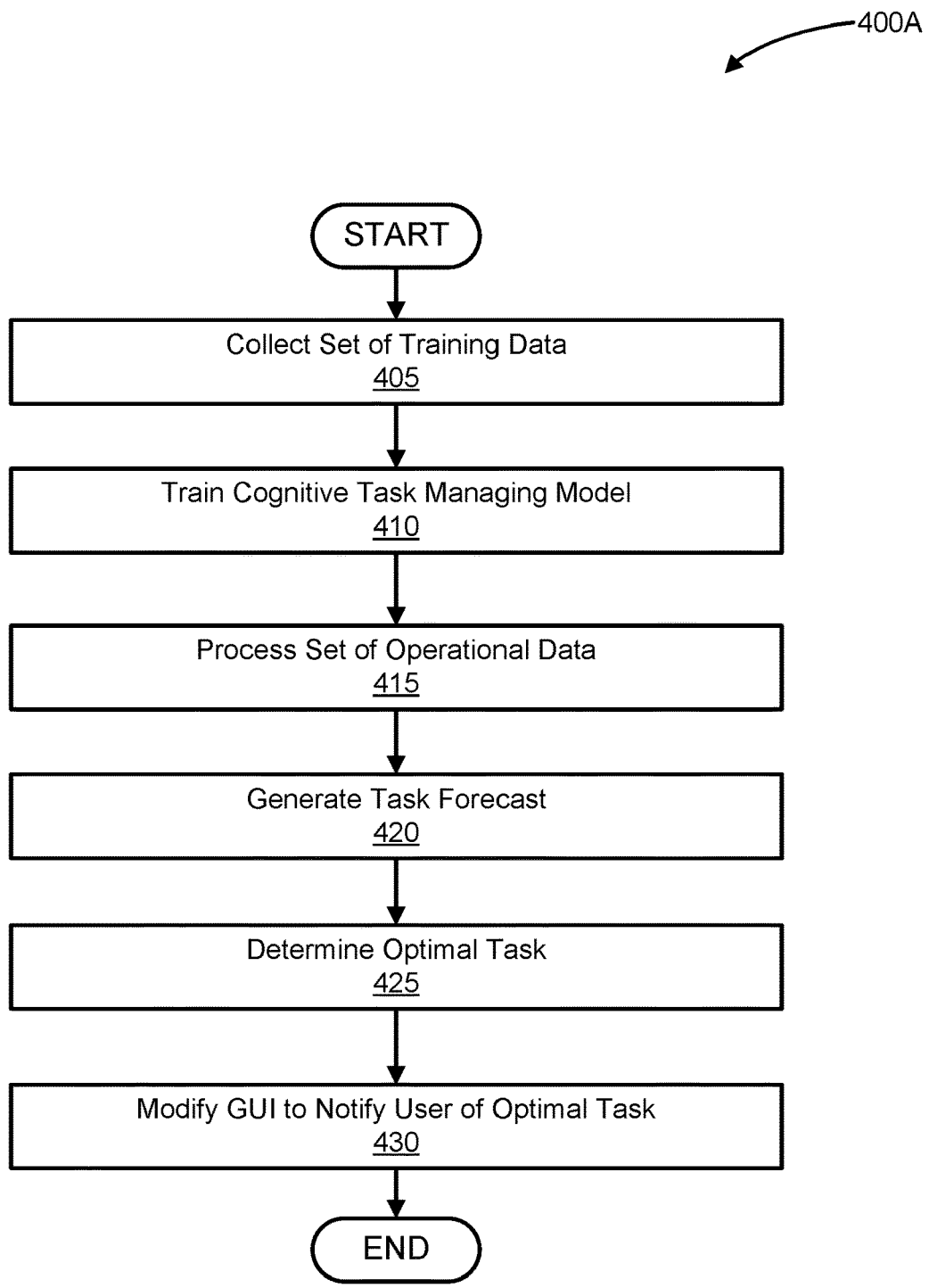
FIG. 4A depicts a flowchart of a method for modifying a GUI according to cognitively forecasted tasks, according to embodiments of the present disclosure.

Referring now to FIG. 4A, illustrated is a flowchart of a method 400A for modifying a graphical user interface (GUI) according to cognitively forecasted tasks, according to embodiments of the present disclosure. At 405, a set of training data is collected. In embodiments, the training data may include univariate time series and features extracted therefrom. For example, a univariate time series may be associated with a particular user at a particular point in time. The univariate time series may include, for example, information regarding the user's collaborative messaging (e.g., emails, instant messages, forum posts, Slack ® channel data, phone call data, Skype® video conference data, etc.), application activity (e.g., which applications the user was running on an associated device at the particular point in time), and scheduling activity (e.g., what the user was scheduled to be doing at the particular point in time, and/or what the user was actually doing at the particular point in time).

At 410, the cognitive task managing model is trained, using the training data collected at 405. In embodiments, the cognitive task managing model may be substantially similar to the cognitive task managing model 260 of FIG. 2. As described herein, the cognitive task managing model may be a neural network, and training the cognitive task managing model may include adjusting the weights/biases used therein to arrive at an expected outcome (e.g., a particular task forecast).

At 415, a set of operational data is processed by the cognitive task managing model. As described herein, operational data may include information found in a user's univariate time series. Features from the user's collaborative messaging data, application activity data, and scheduling activity data may be analyzed (in some embodiments, in real time) by a trained cognitive task managing model to identify the user's upcoming tasks, prioritize them, and identify both the optimal time to perform the task, as well as an optimal set of resources needed for the task (e.g., which channels are most relevant, which users have the most relevant knowledge/experience for the particular task, etc.).

At 420, the task forecast is generated. In embodiments, the task forecast may include a set of univariate time series for a particular user, where the time for each univariate time series in the set is a future time, compared to real time. In embodiments, the future time may be restricted in such a way that a user always has a given amount of time between the real time (e.g., the current time) and the future time associated with the task forecast. For example, the future time may always be at least two hours from the current time. In this way, a user may be given a "buffer" of time to prepare for forecasted tasks.

At 425, an optimal task is determined. Based on the information in the task forecast, an optimal task may be determined for the next time series for a particular user, as described herein.

At 430, a set of GUI elements are modified to notify the user of the optimal task determined at 425. Notifications may include push notifications send to the user's smartphone, email alerts, chat bot messages, pop up notifications sent to the user's computing device, alerts sent to an internet of things (IoT) device near to the user, etc. In embodiments, the alert may contain the information regarding, for example, task parameters (e.g., what the task encompasses), task timeframes (e.g., when the task should be started/completed), task resources (e.g., what other users may be helpful/necessary to include, what collaborative channels/sub channels/tools may be needed, etc.). In embodiments, the notification may include interactive links to the information, as described herein.

Figure 4B:
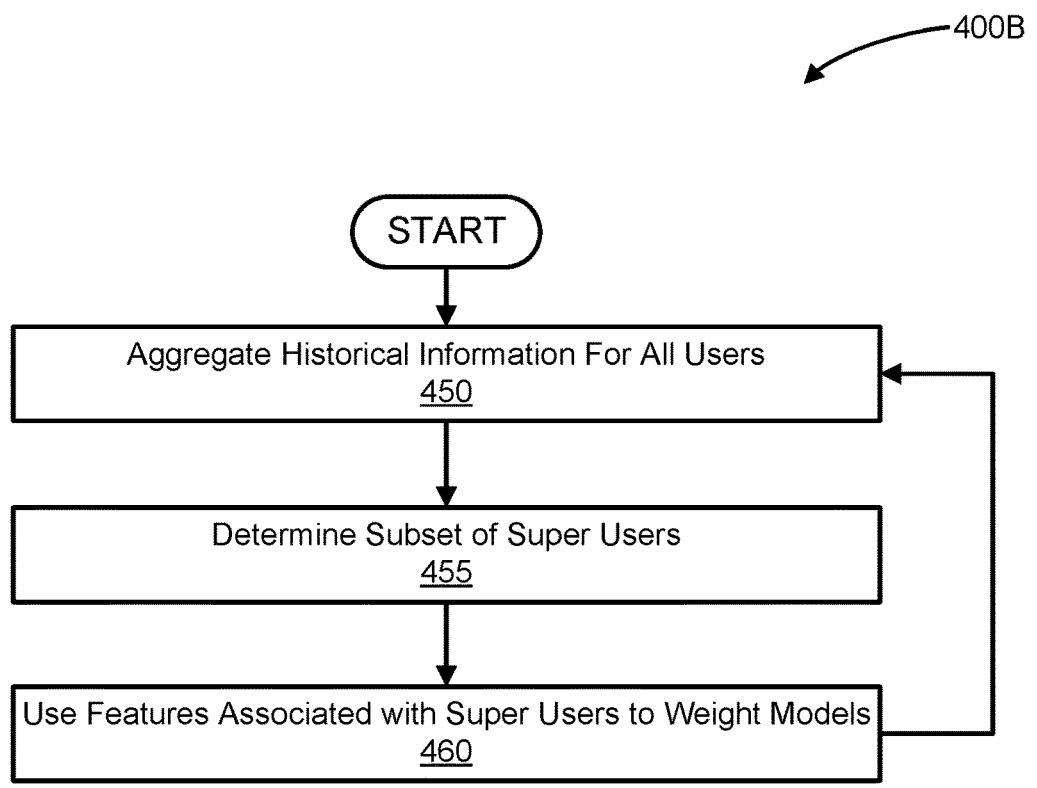
FIG. 4B depicts a flowchart of a method for a feedback loop for adjusting a model for cognitively forecasting user tasks, according to embodiments of the present disclosure.

Referring now to FIG. 4B, illustrated is a flowchart of a method 400B for a feedback loop for adjusting a model for cognitively forecasting user tasks, according to embodiments of the present disclosure. Method 400B may be implemented alongside method 400A of FIG. 4A.

At 450, historical information for all users is aggregated. In embodiments, a plurality of univariate time series for a plurality of users may be aggregated into a historical repository, as described herein.

At 455, a subset of super users is determined. For example, the users exhibiting, based on the historical information, the best efficiency and/or productivity may be determined to be super users.

At 460, the features extracted from the plurality of univariate time series associated with each of the super users may be used as training data to adjust and/or retrain the cognitive task managing model. In this way, the historical information of the most efficient/productive users may be used to improve the efficiency/productivity of all users by influencing task forecasts and causing all task forecasts to more closely resemble the task forecasts of the super users.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
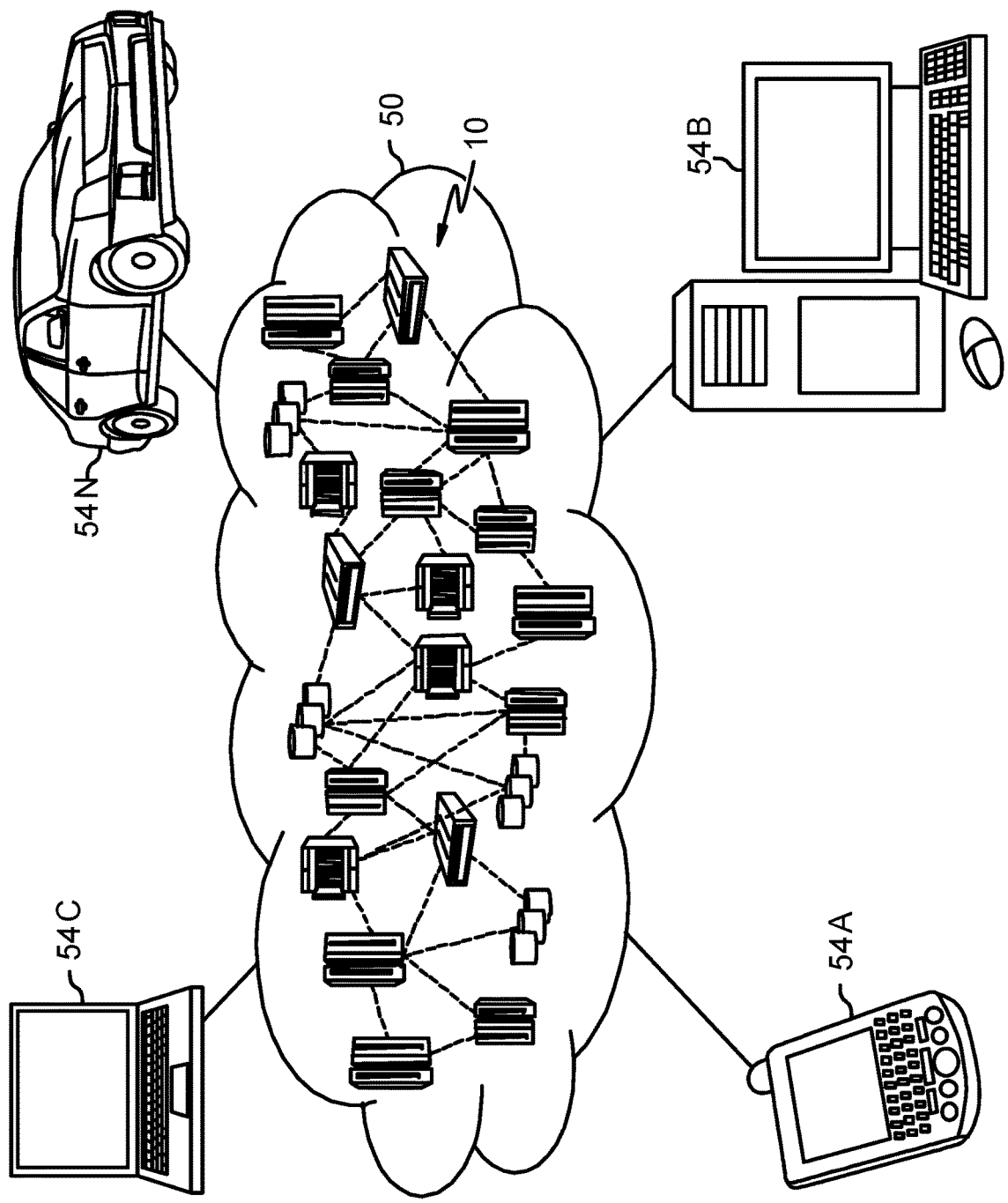
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
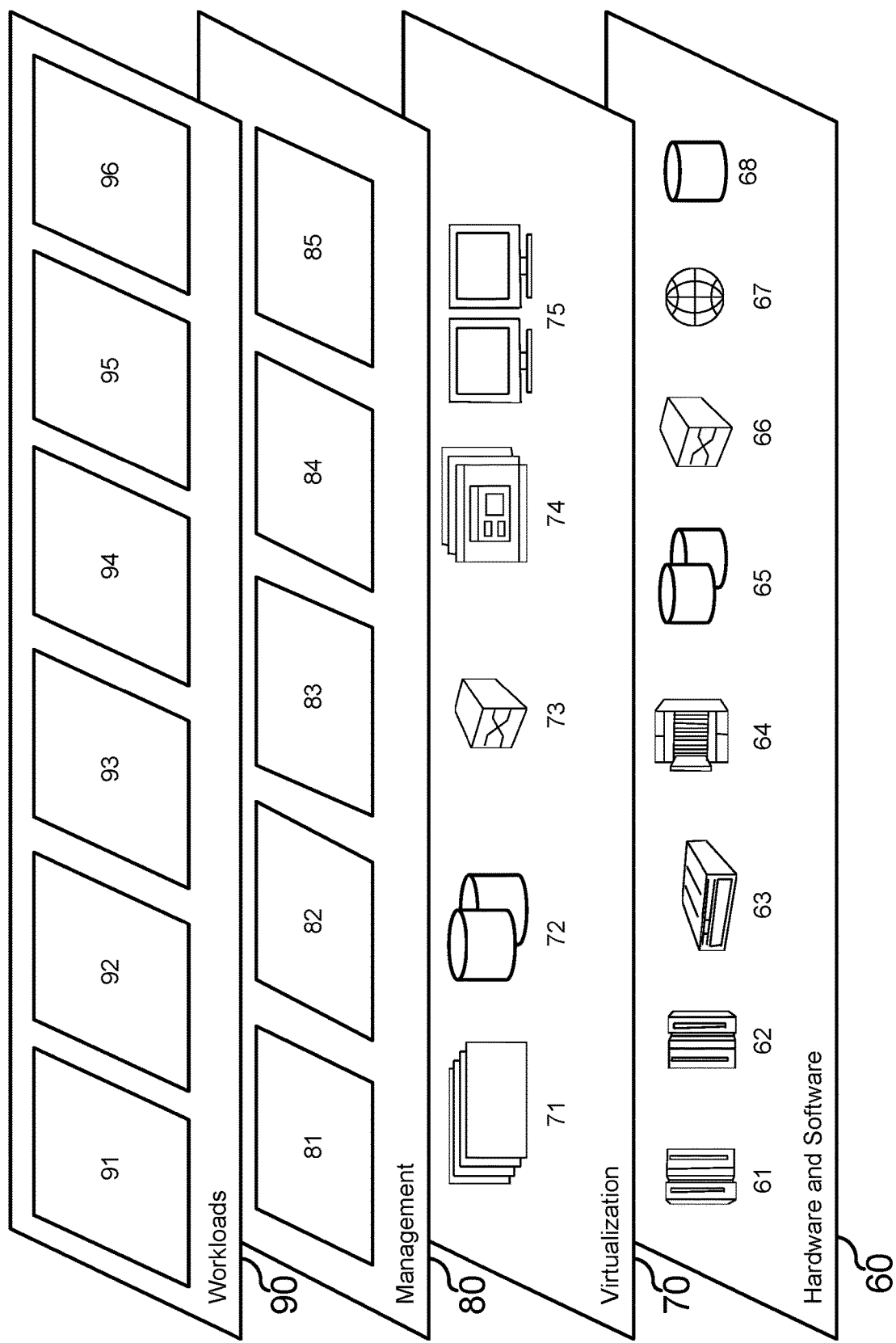
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive forecasting of user tasks 96.

Figure 7:
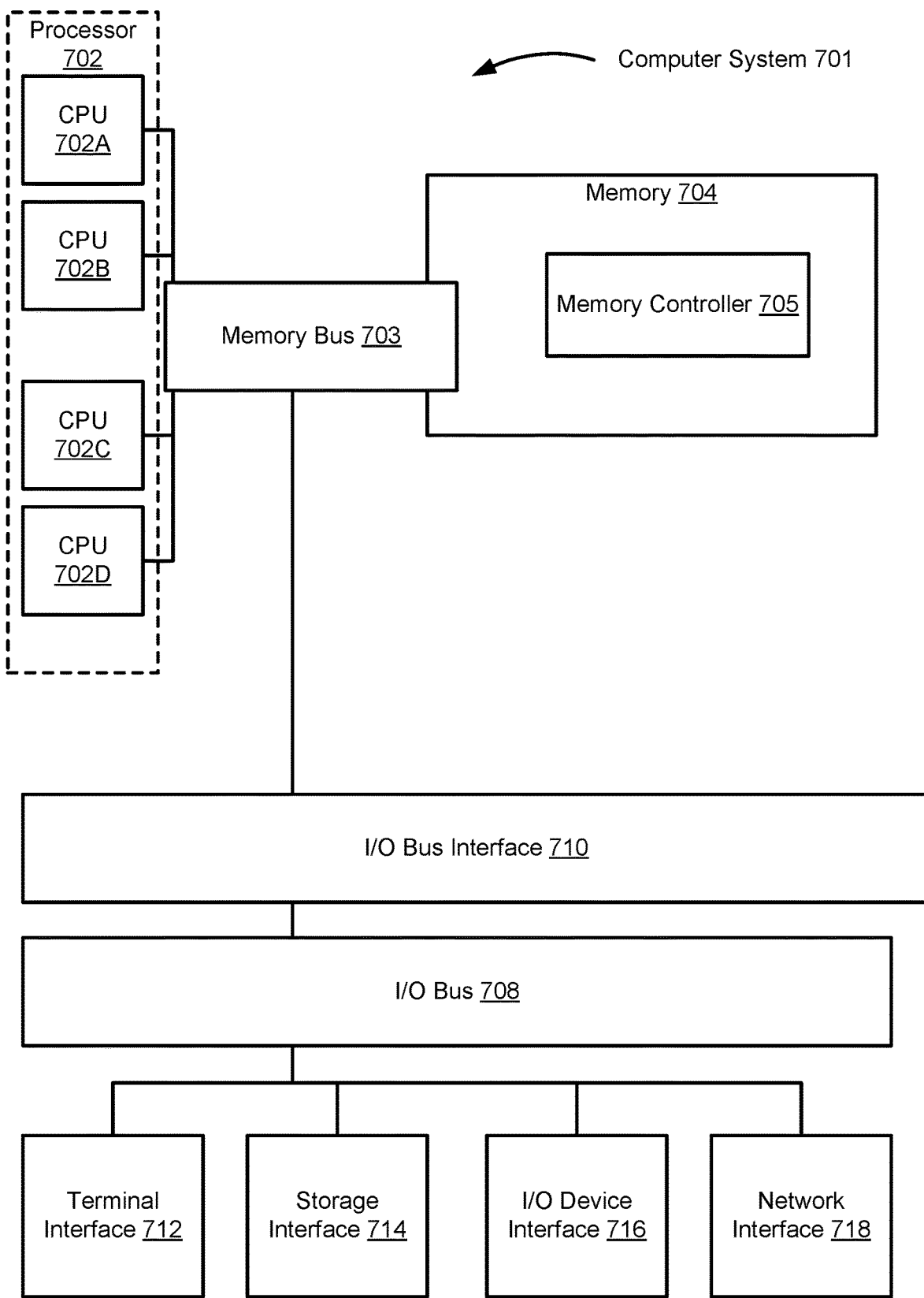
FIG. 7 depicts a high-level block diagram of an example computer system that may be used in implementing embodiments of the present disclosure.

Referring now to FIG. 7, shown is a high-level block diagram of an example computer system (e.g., computer) 701 that may be configured to perform various aspects of the present disclosure, including, for example, methods 400A/400B, described in FIGS. 4A/4B, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an example computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modifying a graphical user interface (GUI) according to cognitively forecasted tasks, the method comprising:
    collecting a set of training data for a cognitive task managing model, the set of training data associated with a user, wherein the set of training data includes a plurality of univariate time series datasets, and wherein each univariate time series dataset includes collaborative messaging data, application activity data, and scheduled activity data for the user at a particular time;
    training the cognitive task managing model, using the set of training data;
    processing, using the cognitive task managing model, a set of operational data associated with the user;
    in response to receiving a set of processed operational data, generating a task forecast for the user;
    determining, based on the task forecast, an optimal task for the user; and
    modifying a set of graphical elements within the GUI to notify the user of the optimal task.

2. The method of claim 1, wherein the cognitive task managing model employs a Micro Seasonal Autoregressive Integrated Moving Average (msARIMA).

3. The method of claim 1, wherein collaborative messaging data includes email, text message, instant messaging, collaborative platform communications, and audio communications.

4. The method of claim 1, wherein the application activity data includes applications associated with the user that are in use at the particular time.

5. The method of claim 1, wherein the scheduled activity data includes calendar entries, program schedules, and historical information associated with the user at the particular time.

6. The method of claim 3, wherein modifying a set of graphical elements within the GUI includes initiating a chat bot to remind the user of the optimal task, wherein the chat bot presents, to the user, an interactive link, via the GUI, that directs the user to a set of resources needed for the optimal task.

7. A computer program product for modifying a graphical user interface (GUI) according to cognitively forecasted tasks, the computer program product comprising a computer readable storage medium having program instructions embodied therewith, the program instructions executable by a device to cause the device to:
    collect a set of training data for a cognitive task managing model, the set of training data associated with a user, wherein the set of training data includes a plurality of univariate time series datasets, and wherein each univariate time series dataset includes collaborative messaging data, application activity data, and scheduled activity data for the user at a particular time;
    train the cognitive task managing model, using the set of training data;
    process, using the cognitive task managing model, a set of operational data associated with the user;
    in response to receiving a set of processed operational data, generate a task forecast for the user;
    determine, based on the task forecast, an optimal task for the user; and
    modifying a set of graphical elements within the GUI to notify the user of the optimal task.

8. The computer program product of claim 7, wherein the cognitive task managing model employs a Micro Seasonal Autoregressive Integrated Moving Average (msARIMA).

9. The computer program product of claim 7, wherein the collaborative messaging data includes email, text message, instant messaging, collaborative platform communications, and audio communications.

10. The computer program product of claim 7, wherein the application activity data includes applications associated with the user that are in use at the particular time.

11. The computer program product of claim 7, wherein the scheduled activity data includes calendar entries, program schedules, and historical information associated with the user at the particular time.

12. The computer program product of claim 9, wherein modifying a set of graphical elements within the GUI includes initiating a chat bot to remind the user of the optimal task, wherein the chat bot presents, to the user, an interactive link, via the GUI, that directs the user to a set of resources needed for the optimal task.

13. A system for modifying a graphical user interface (GUI) according to cognitively forecasted tasks, comprising:
    a memory with program instructions stored thereon; and
    a processor in communication with the memory, wherein the program instructions are executable by the processor to cause the system to:
        collect a set of training data for a cognitive task managing model, the set of training data associated with a user, wherein the set of training data includes a plurality of univariate time series datasets, and wherein each univariate time series dataset includes collaborative messaging data, application activity data, and scheduled activity data for the user at a particular time;

train the cognitive task managing model, using the set of training data;
process, using the cognitive task managing model, a set of operational data associated with the user;
in response to receiving a set of processed operational data, generate a task forecast for the user;
determine, based on the task forecast, an optimal task for the user; and
modifying a set of graphical elements within the GUI to notify the user of the optimal task.

14. The system of claim 13, wherein the cognitive task managing model employs a Micro Seasonal Autoregressive Integrated Moving Average (msARIMA).

* * * * *